United States Patent [19]

Rogers

[11] Patent Number: 4,596,050

[45] Date of Patent: Jun. 17, 1986

[54] INFORMATION PROCESSING SYSTEM USING OPTICALLY ENCODED SIGNALS

[76] Inventor: Gordon W. Rogers, 19714 Ayers Ave., Escalon, Calif. 95320

[21] Appl. No.: 604,024

[22] Filed: Apr. 26, 1984

[51] Int. Cl.⁴ .............................. H04B 9/00
[52] U.S. Cl. .................................... 455/607; 250/551; 350/620; 455/602; 455/617
[58] Field of Search ............... 455/600, 601, 602, 606, 455/607, 610, 617, 612; 350/96.15, 96.16, 96.18, 618, 619, 620, 628; 250/551

[56] References Cited

U.S. PATENT DOCUMENTS

| 2,198,014 | 4/1940 | Ott ....................... | 350/620 |
| 3,370,174 | 2/1968 | Toussaint ................ | 250/551 |
| 4,189,236 | 2/1980 | Hogg et al. .............. | 350/620 |
| 4,346,478 | 8/1982 | Sichling ................. | 455/612 |
| 4,358,858 | 11/1982 | Tamura et al. .......... | 350/96.15 |
| 4,422,214 | 12/1983 | Benoit et al. ........... | 350/96.15 |

FOREIGN PATENT DOCUMENTS

| 323006 | of 1920 | Fed. Rep. of Germany ...... | 350/620 |
| 2104752 | 3/1983 | United Kingdom ................ | 455/610 |

OTHER PUBLICATIONS

Lean-Taps for Multimode Fibers—IBM Tech. Disclosure Bull. vol. 21, #4 Sep. 1978, p. 1685.

*Primary Examiner*—Joseph A. Orsino, Jr.
*Attorney, Agent, or Firm*—Flehr, Hohbach, Test, Albritton & Herbert

[57] ABSTRACT

An information processing system having an ellipsoid reflector, an optical signal processor, and a receiver. The ellipsoid reflector has an internal light-reflecting surface and first and second focal points. The optical signal processor includes a transmitter for transmitting a plurality of optically encoded signals along various distinct paths, where a portion of each path coincides with a line that passes through the first focal point. Where there signals travel along a path emanating from the first focal point, they are reflected by the ellipsoid reflector towards the second focal point. The receiver, which is at least partially located at the second focal point of the ellipsoid, collects those reflected signals for further processing. In a preferred embodiment the receiver includes a parabolic reflector with an external light-reflecting surface. Its focal point coincides with the second focal point of the ellipsoid reflector and its axis coincides with the major axis of the ellipsoid reflector. The system allows connectorless routing of optical signals from one part of an information processing system to another.

13 Claims, 7 Drawing Figures

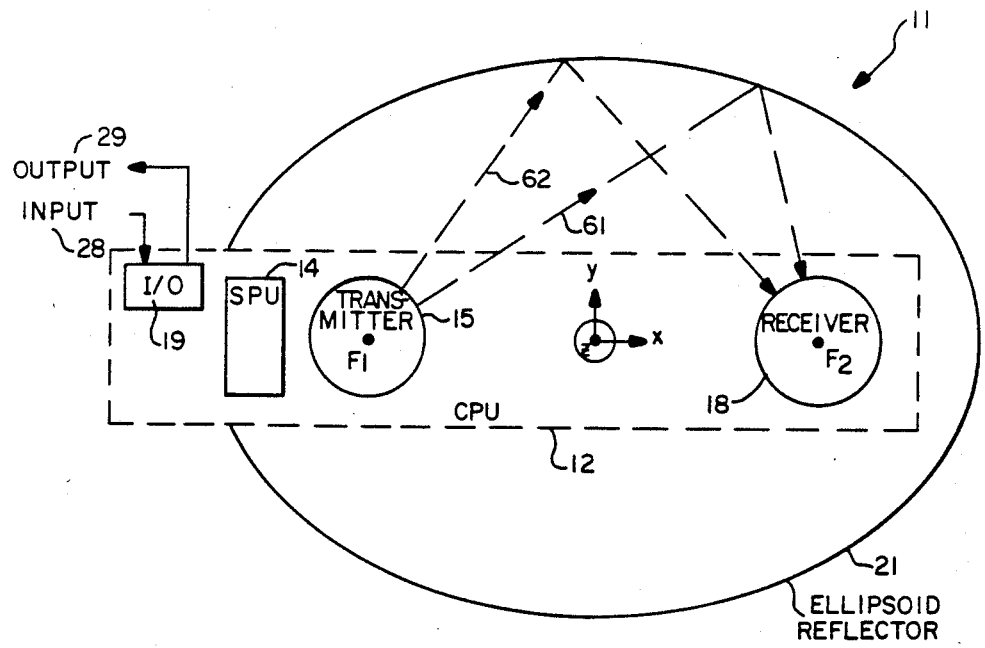
FIG.—1
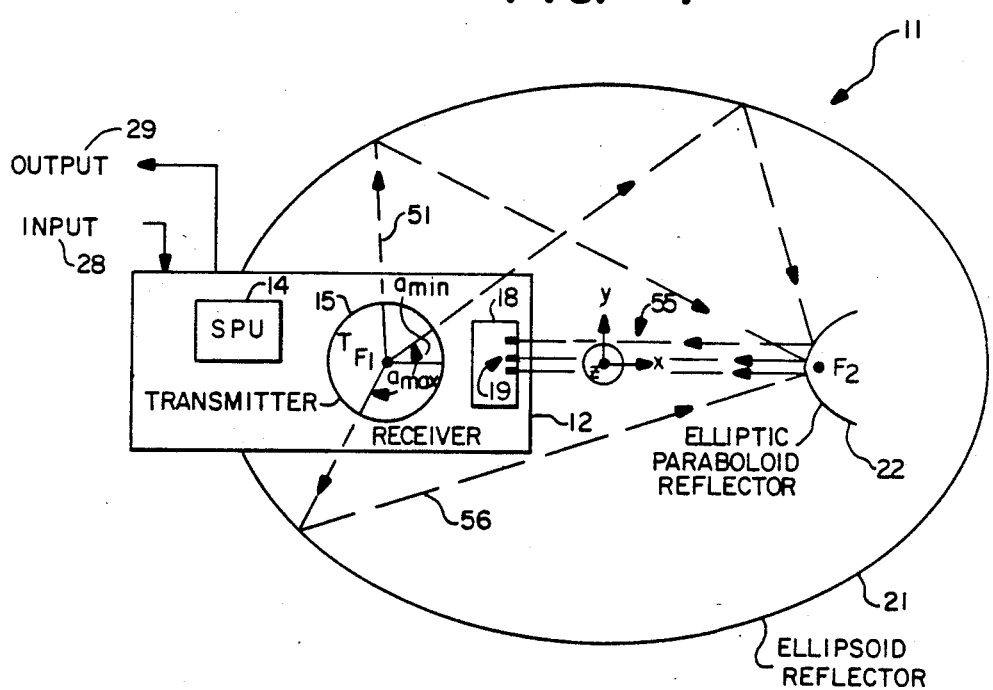
FIG.—3

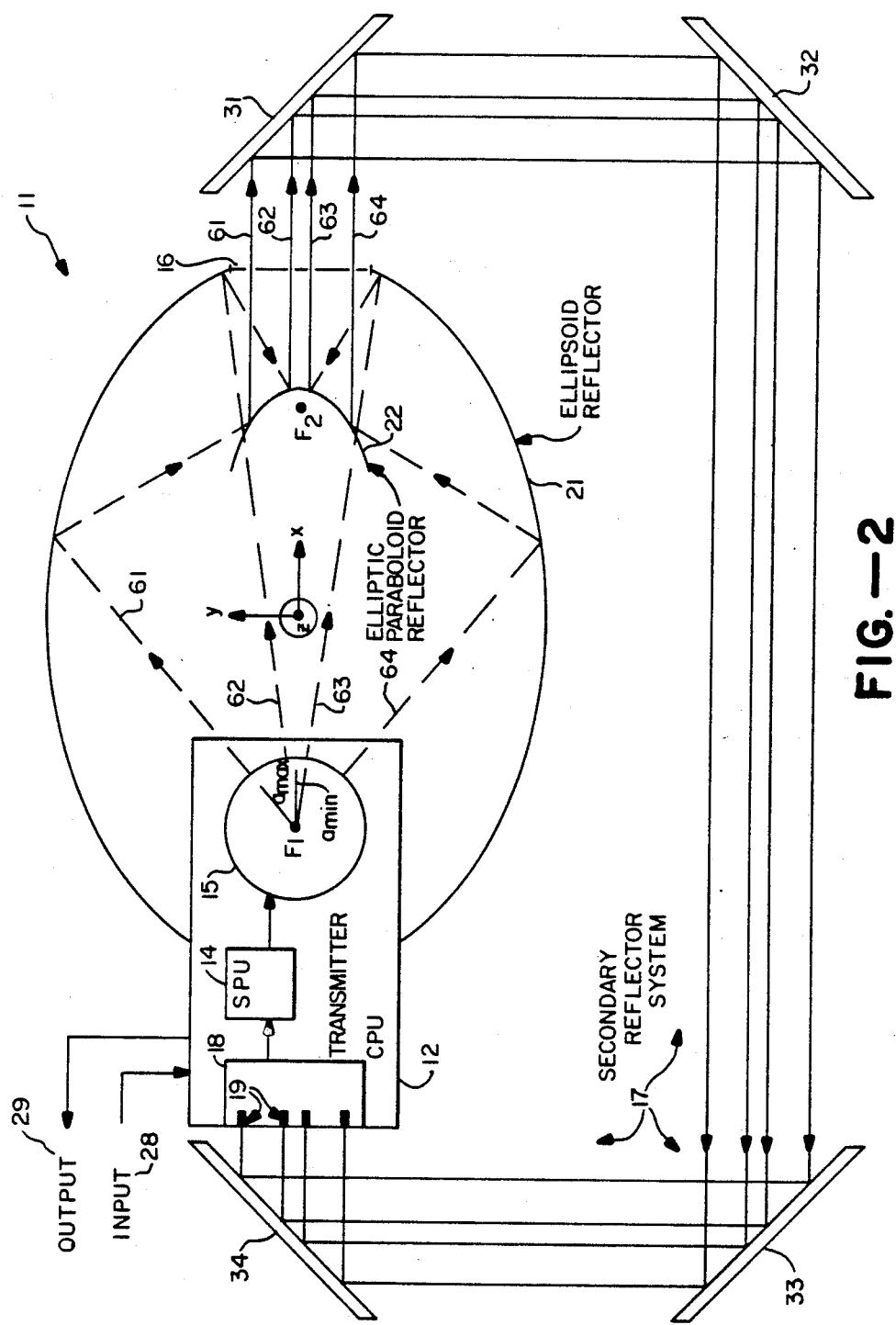
FIG.—2

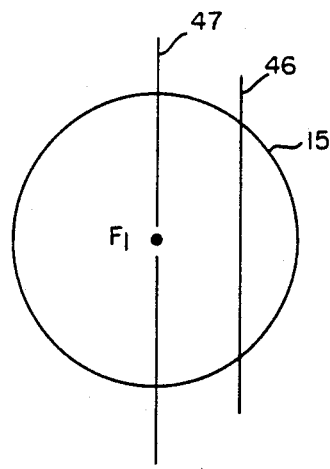
FIG.—4A
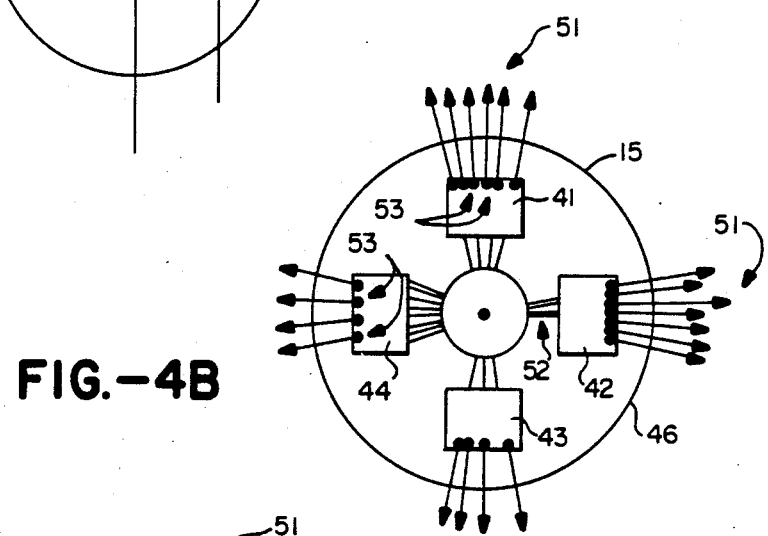
FIG.—4B
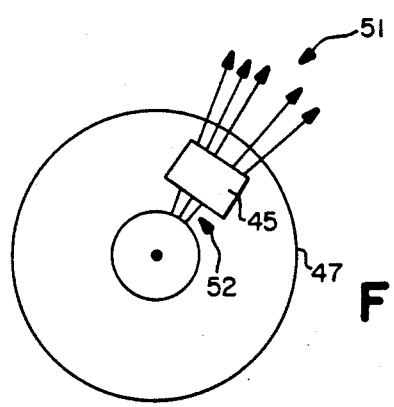
FIG.—4C
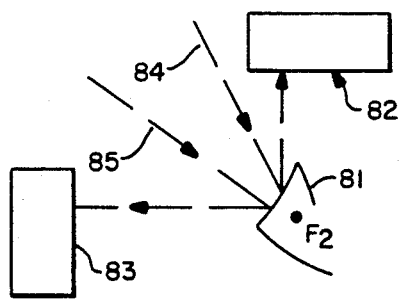
FIG.—7

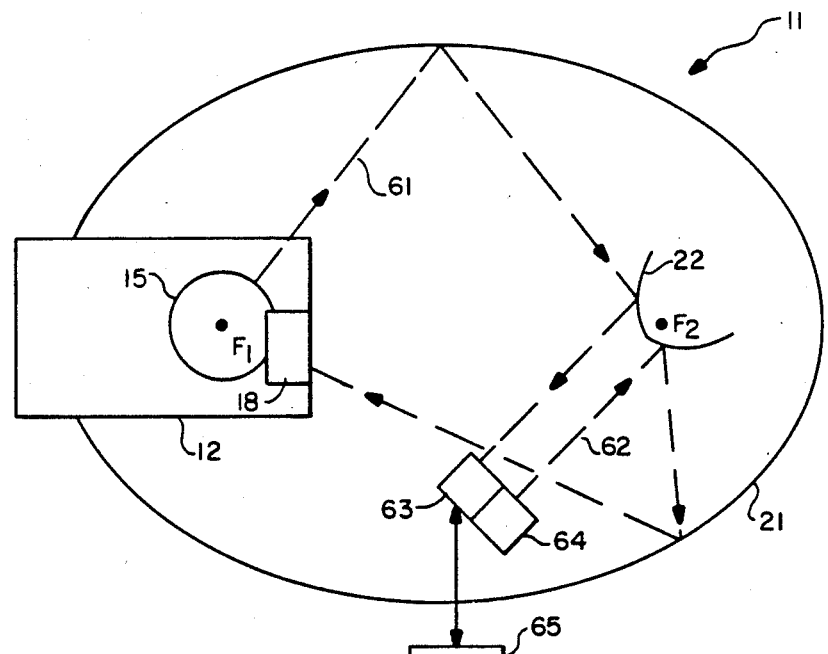
FIG.—5
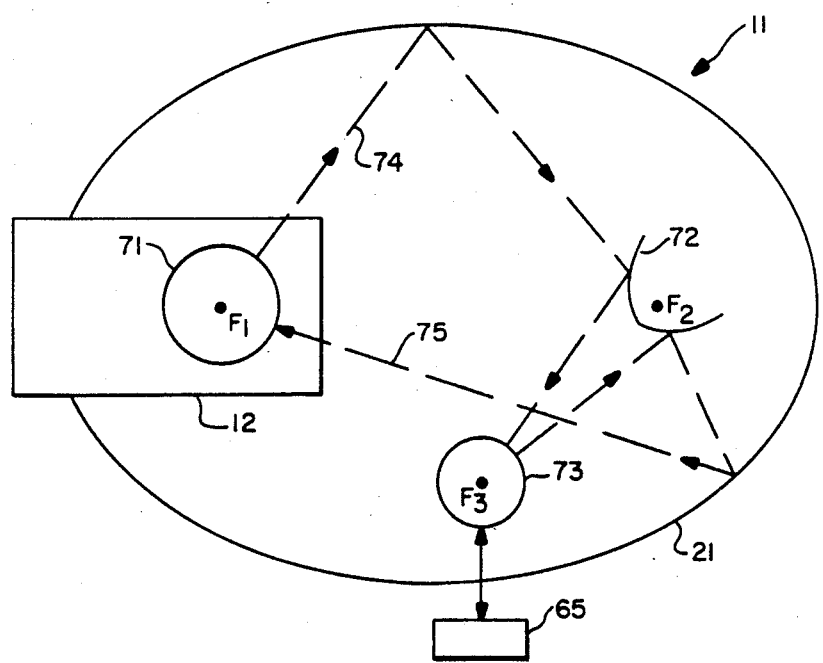
FIG.—6

INFORMATION PROCESSING SYSTEM USING OPTICALLY ENCODED SIGNALS

The present invention relates generally to information processing systems and in particular to a system architecture and organization method which facilitates the routing of optically encoded signals to and from selected portions of such a system.

The current state of the art of information processing systems which incorporate or use optical signal processing includes a variety of optical signal processing components, fiber optic means for routing signals from one point to another, means for converting optical signals into electronic signals and vice versa, and optical means (e.g., mirrors) for changing the direction of light beams. The problem addressed by the current invention is system architecture. As is well known, bus structures and other standard system architectures are essential to the development of useful electronic computer systems. Due to the nature of optical signals and fiber optic carriers, the use of such bus structures to convey optically encoded signals is cumbersome. Thus there is a need for a different method or architecture for routing optically encoded signals from one part of an information processor to another. The present invention provides such an architecture.

Another aspect of the prior art concerns the well known mathematical properties of ellipsoids and parabolas and hyperboloids. For instance it is well known that an ellipsoid reflector (i.e., an ellipsoidal body having an internal light-reflecting surface) will reflect light emanating from one focal point of the ellipsoid to the other focal point of the ellipsoid regardless of the direction that the light is transmitted. See U.S. Pat. No. 3,238,470 (Mooney), U.S. Pat. No. 3,266,313 (Litterst); U.S. Pat. No. 3,588,739 (Yoshikawa et al.); U.S. Pat. No. 3,801,773 (Matsumi); and U.S. Pat. No. 4,360,275 (Louderback). Similarly the mathematical properties of parabolic reflectors are well known.

It is therefore a primary object of the invention to provide an improved information processing system architecture using an optical signal routing system.

Another object of the invention is to provide an improved optical signal routing system making advantageous use of the light reflecting properties of ellipsoids and paraboloids.

Yet another object of the invention is to reduce the number of connectors needed in a optical signal routing system.

In summary, there is provided an information processing system having an ellipsoid reflector, an optical signal processor, and a receiver. The ellipsoid reflector has an internal light-reflecting surface and first and second focal points. The optical signal processor includes a transmitter for transmitting a plurality of optically encoded signals along various distinct paths, where a portion of each path coincides with a line that passes through the first focal point. Where these signals travel along a path emanating from the first focal point, they are reflected by the ellipsoid reflector towards the second focal point. The receiver, which is at least partially located at the second focal point of the ellipsoid, collects those reflected signals for further processing. In a preferred embodiment the receiver includes a parabolic reflector with an external light-reflecting surface. Its focal point coincides with the second focal point of the ellipsoid reflector and its axis coincides with the major axis of the ellipsoid reflector. The system allows connectorless routing of optical signals from one part of an information processing system to another.

Additional objects and features of the invention will be more readily apparent from the following detailed description and appended claims when taken in conjunction with the drawings, in which:

FIG. 1 is a block diagram of an information processing system in accordance with the present invention.

FIG. 2 depicts a first embodiment of an information processing system in accordance with the present invention.

FIG. 3 depicts a second embodiment of an information processing system in accordance with the present invention.

FIGS. 4A through 4C depict schematic views of one portion of an optical central processing unit for use in the present invention.

FIGS. 5, 6 and 7 depict variations of the embodiment shown in FIG. 3.

Referring to FIG. 1, there is shown a block diagram of an information processing system 11 in accordance with the invention. The basic architecture of such a system 11 includes an ellipsoid reflector 21 and an optical central processing unit (CPU) 12 at least partially enclosed in the ellipsoid reflector 21. The CPU 12 includes a signal processing unit (SPU) 14, an optical signal transmitter 15, and an optical signal receiver 18. It also includes input/output means 19 for receiving input signals 28 from, and transmitting output signals 29 to, points outside the system 11. Optically encoded signals 61–62 flow from the transmitter 15 to the receiver 18 in a manner described in more detail below.

For the purpose herein, an optical signal routing system is a system for transmitting and receiving optically encoded signals. An optically encoded signal is a modulated electro-magnetic or photonic beam having a frequency within the spectrum of electro-magnetic waves that can be collimated and reflected off an ellipsoid reflector. In the preferred embodiments the optically encoded signal is generated by a diode laser and thus is confined to the portion of the spectrum which can be produced by such devices. For convenience, optically encoded signals are sometimes referred to herein as light beams.

Furthermore, the invention herein is set in the context of any information processing system using optically encoded signals. Thus the information processing system may use electronic, optical or opto-electronic processing subsystems (or any combination thereof) for processing the information being carried on the optically encoded signals which are the subject of this invention. The basic building blocks or components for making an information processing system in accordance with the invention, including a signal processing unit, transmitter, receiver, and reflectors are readily available.

While it is assumed for purposes of the discussion of the preferred embodiment that the optically encoded signals are embodied in collimated light beams, the invention also encompasses systems using emission systems having relatively wide angles of dispersion. In such cases, only a selected portion (i.e., cross-section) of each transmitted beam is received, which is sufficient to receive the information encoded therein.

Referring to FIG. 2, there is shown a first preferred embodiment of the invention. The transmitter 15 is located at or around the first focal point F1 of the ellipsoid reflector 21. At the other ellipsoid focal point F2 there is located an elliptic paraboloid reflector 22 (referred to here as a parabolic reflector 22). In the first preferred embodiment there is also a secondary signal reflector system 17 for routing the light reflected by the parabolic reflector 16 around the exterior of the ellipsoid and back into the central processor 12 via receiver 18. In the embodiment shown in FIG. 2, there is an opening 16 in the ellipsoid reflector 21 coupling parabolic reflector 22 to mirror 31. The reflector system 17 comprises four flat mirrors 31, 32, 33, 34 so aligned as to serially reflect optically encoded signals emanating from the parabolic reflector 22 back to the CPU 12.

The transmitter 15 may include a multiplexer and the receiver 18 may include a demultiplexer (not shown) for internal routing of signals in the CPU 12. As is common in fiber optic systems, the receiver may also include a repeater or amplifier. The receiver will generally have a plurality of receiver elements 19, one for each transmission channel 61–64. In other embodiments there could be a signal receiver element for multiple channels, for instance where the various channels had distinct carrier frequencies and the receiver element physically intersected the paths of all the channels and thereby combined a plurality of spectrally distinct signals.

In some versions of the first embodiment the parabolic reflector 16 may be half-silvered so as to be transparent to signals impinging on its interior and yet reflect signal impining on its exterior. However, since no signals can be allowed to escape through opening 16 in a non-parallel direction, provision must be made to either block any such signals (e.g., by coating the central protion of the interior surface of the parabolic reflector 16 with a signal absorbing material) or, more likely, to ensure that no such signals are ever generated by the system.

In terms of standard information processing system terminology, each distinct path 61–64 for an optically encoded signal comprises a distinct channel for transmitting information.

As is well known from the prior art, ellipsoid reflectors have the property that light beams emanating from one focal point of the ellipsoid are automatically reflected to the other focal point of the ellipsoid. A second well known property of ellipsoid reflectors is that the length of all paths from one focal point to the other are the same, independent of where on the reflecting surface the path is reflected. In other words, an ellipsoid is the locus of points E(x,y,z) the sum of whose distances from two fixed points (the foci) is constant. For the purposes herein, the major axis of an ellipsoid is the axis intercepting both foci of the ellipsoid.

The standard equation for an ellipsoid is:

$$x^2/a^2 + y^2/b^2 + z^2/c^2 = 1$$

Assuming that the major axis of the ellipsoid is along the x-axis, the focal distance, f, of the ellipsoid (i.e., the distance from the center of the ellipsoid to either foci) is the square root of $a^2 - b^2 - c^2$.

In the present invention, a plurality of optically encoded signals are transmitted from the CPU 12 along various distinct paths emanating from a first focal point F1 of an ellipsoid reflector 21. Therefore these optically encoded signals are automatically reflected towards the second focal point F2.

As is also well known from the prior art, parabolic reflectors have the property that light beams emanating from the focal point are automatically reflected in a direction parallel to the axis of the parabola. A corollary of this property is that, for an elliptic paraboloid having an external reflecting surface (referred to here as an external parabolic reflector), optical signals converging on the focal point are automatically reflected in a direction parallel to the major axis of the paraboloid. Naturally, an externally reflected signal travels in the opposite direction of a signal emanating from the focus along the same line and reflected by the internal surface. A second well known property of paraboloid is that the distance from the focus to any point on the paraboloid is the same as the distance from that point on the paraboloid to a plane called the directrix. The directrix is a plane perpendicular to the axis of the paraboloid and displaced one focal distance below the vertex of the paraboloid. Restated, an elliptic paraboloid is the locus of points P(x,y,z) equidistant from a given point (the focus) and a given plane (the directrix).

The standard equation for an elliptic paraboloid is:

$$y^2 + z^2 = 4px$$

where p is the focal distance (i.e., the distance from the focal point to the vertex) of the paraboloid.

In both preferred embodiments an external parabolic reflector 22 is located with its focus at the second focal point F2 of the ellipsoid reflector 21 and oriented with its axis parallel to the major axis of the ellipsoid 21. In the first preferred embodiment, the vertex of the parabolic reflector 22 points away from the first focal point F1; in the second preferred embodiment (see FIG. 3) the vertex of the parabolic reflector points towards the first focal point F1.

In accordance with the physical properties of the ellipsoid and parabolic reflectors, signals emanating from the CPU 12 along various distinct lines emanating from the first focal point F1 are reflected first by the ellipsoid reflector towards the second focal point F2 and then by the parabolic reflector along paths parallel to the major axis of the ellipsoid 21. Also, the equidistant length of every signal path, in either embodiment, eliminates the need for worst-case timing and phase shift considerations.

Thus, in the first embodiment (see FIG. 2), the parabolic shape of the reflector 22 causes light beams reflected from the first focal point F1 towards the second focal point F2 to be reflected along the principal axis of the ellipsoid reflector 21 and away from the central processor 12 through opening 16. The optically encoded signals are then routed back to the CPU 12 by the secondary reflector system 17.

Referring to FIGS. 4A–4C, there is shown a portion of the CPU 12 including a transmitter 15. The basic concept here is that signals leaving the transmitter 15 are transmitted along various distinct lines emanating from the first focal point F1. Each distinct path comprises a separate information transmission channel. In the preferred embodiment, integrated optical components 41–45 are mounted on planar media laying in one or more planes 46–47, each having transmitting elements 53 yielding emissions which eminate along paths which intersect the first focal point F1. In other embodiments the transmitting components could be discrete components, such as single diode lasers, or a mixture of discrete and integrated components. In the preferred embodiment the output signals are generated by diode lasers incorporated in integrated optical circuits.

The output optical signals 51 are oriented so as to emanate radially from the focal point F1.

As with any circuit, the number of input signals 52 and output signals 51 for any circuit 41-45 or set thereof will be different and the particular numbers are of no importance to the invention. However, for each output signal 51 the receiver 18 will need a receiver element 19 (see FIG. 2) to receive and route the signals. That is, each channel must have both transmitting and receiving elements.

Referring to FIG. 2, the selection of the shape of the ellipsoid reflector 21 and the paraboloid reflector 22 place certain constraint on the directions in which signals 61-64 can be transmitted from the CPU 12. In particular the size of the aperture 16 through which signals are transmitted to the secondary reflector system 17 limits the angles at which such signals can be directed. The size and shape of the parabolic reflector 22 may further restrict the available directions in which signals can be transmitted if the parabolic reflector 22 subtends a greater angle with respect to the first point than is subtended by the aperture 16. This latter restriction can be avoided by providing a half-silvered reflector 22 which allows the transmission of signals impinging on its interior and yet reflects signal impinging on its exterior.

The maximum angle, $a_{max}$, that the transmitted signal 61 can make with the major axis is that angle which will generate a signal that exits just within the perimeter of the aperture. The minimum angle, $a_{min}$, is the minimum angle of the major axis with a line from the focal point F1 to a point just outside the perimeter of the aperture 16 which can reflect a signal back to the parabolic reflector 22. Thus the set of possible signal paths exiting the aperture 16 form a ring in the plane perpendicular to the plane shown in FIG. 1.

As should be clear from the above description, the invention can be embodied in a system using only a small portion of an ellipsoid reflector. The only requirement is that a sufficient portion of ellipsoid shaped reflector be provided to handle the number of signal channels needed in the system. Thus, for the purposes herein, an "ellipsoid reflector" or a "reflecting surface in the shape of an ellipsoid" comprises a reflector in the shape of at least a portion of an ellipsoid.

Referring to FIG. 3, the use of a secondary transmission system 17 can be avoided by reversing the orientation of the parabolic reflector 22, if other physical system constraints can be accommodated. In particular, at least a portion of the receiver 18 for handling reflected signals 51 must fit inside the ellipsoid reflector 21 and must have a small enough size to leave a sufficient set of available transmission angles for the transmitter 15. In the embodiment shown in FIG. 3, the minimum angle, $a_{min}$, is the angle that just clears the receiver 18 and also generates a reflected signal 55 within a certain maximum distance from the major axis of the ellipsoid 21. The maximum angle, $a_{max}$ is the angle which generates a reflected signal 56 which just clears the receiver 18 and any other parts of the CPU 12 which might get in the way.

In some embodiments (not shown) the receiver 18 could be totally outside the ellipsoid reflector 21 if a cylindrical core of the CPU is left clear for the transmission of reflected signals through the transmitter 15 and possibly other portions of the CPU 12.

In another variation on the embodiment shown in FIG. 3, unit 18 could be a transmitter and unit 15 could be a receiver. In such an alternate embodiment the direction of the signal paths 51, 55 and 56 would be the opposite of the direction indicated in FIG. 3. In effect, the roles of the two foci would be reversed, with the optically encoded signals travelling along paths which include a portion of a line emanating from focus F2 and being reflected by the ellipsoid reflector 21 towards focus F1. Thus the designation of "first" and "second" focal points, indicating where the signal is emanating from the being reflected towards, is somewhat arbitrary and dependent on the particular embodiment and even on the particular signal channel which is being discussed.

The particular technology used in the CPU 12, including the signal processor unit SPU 14, is not limited by the present invention. Thus the CPU 12 may include both optical and electronic signal processing means, including means for transforming optical signals into electrical signals and vice versa.

The structures shown may act much like the bus structures in electronic computers. The bus in this case comprises the set of signal paths travelling through the ellipsoid reflector 21. The optical signals can be synchronized to a central clock by means of optical or electronic AND (or NOR) gates in the transmitter 15 and/or receiver 18 to provide a synchronized bus. The ellipsoid reflector system provides a connectorless means for transmitting data from one part of an optical computer or signal processor to another.

Referring to FIGS. 5 through 7, there are shown a few types of variations of the optical routing system which are encompassed by the invention. FIG. 5 shows a system wherein parabolic reflector 22 has a focus coincident with $F_2$, but having an axis which is not aligned with the major axis of the ellipsoid reflector 21. Signals 61 emanating along paths from the first focal point $F_1$ are reflected towards a receiver 63 along a path not parallel to the major axis of the ellipsoid 21. The receiver 63 may be part of a subsystem including a transmitter 64 and a second information processing unit 65. Signals 62 emanating from the transmitter 64 are reflected off the parabolic reflector 22 to a receiver 18 in CPU 12. This arrangement can be used to provide for communications between separate information processing units 12 and 65.

In FIG. 6 the reflector 72 at the second focal point $F_2$ has the shape of a hyperboloid rather than a elliptic paraboloid. The hyperboloid has a focus coincident with $F_2$. It is assumed for the purpose of this discussion that the hyperboloid reflector 72 comprises one-half of a circular hyperboloid of two sheets. Signals emanating from the first focal point $F_1$ and reflected toward the second focal point $F_2$ by the ellipsoid reflector 21 are directed by the hyperboloid reflector 72 towards a third focal point $F_3$. The location of the third focal point $F_3$ is a function of the shape and orientation of the hyperboloid reflector 72. As in FIG. 5, the reflector 72 in this embodiment is shown having a axis distinct from the major axis of the ellipsoid 21. In another embodiment these two axes could be coincident. Also as in FIG. 5, there is a transmitter/receiver 71 at the first focal point $F_1$. At the third focal point $F_3$ there is a transmitter/receiver 73 which may be connected to a second information processing unit 65. The main difference between the embodiments shown in FIGS. 5 and 6 is the orientation of the communication paths 74 and 75 in and out of the transmitter/receiver 73 associated with the second information processing unit 65.

Referring to FIG. 7, there is shown a multifaceted reflector 81 for use at the second focal point $F_2$ of the ellipsoid reflector 21 (not shown). Each facet of the multifaceted reflector 81 has a reflective surface comprising a portion of an elliptic paraboloid or hyperboloid having a focal point coincident with the second focal point $F_2$. By using a multifaceted reflector 81, a first set of signal paths 84 can be associated with a first transmitter/receiver 82, a second set of signal paths 85 can be associated with a second transmitter/receiver 83, and so on.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, the invention incorporates embodiments where the ellipsoid reflector comprises two or more partial ellipsoids with each partial ellipsoid sharing a common focus with at least one of the other partial ellipsoids. In such an arrangement, the same principles of operation are applied as in the above described embodiments, although the geometries involved as somewhat more complex.

What is claimed is:

1. In an information processing system:
   means defining an internal reflecting surface in the shape of an ellipsoid having first and second focal points;
   optical signal processing means including means for simultaneously transmitting a plurality of distinct optically encoded signals along various distinct paths, a portion of each said path coinciding with a line emanating from a first one of said focal points, whereby said signals are reflected from said reflecting surface towards the second one of said focal points; and
   optical signal receiving means for collecting said signals, after reflection from said ellipsoid reflecting surface, for further processing;
   wherein
   at least a part of said optical signal processing means is located at or around said first focal point of said ellipsoid reflector; and
   said optical signal receiving means includes optical routing means for reflecting optically encoded signals converging on said second focal point back to said optical signal processing means.

2. An information processing system as set forth in claim 1, wherein
   said optical receiving means includes
   (a) parabolic reflector means having a focal point coinciding with one of said focal points of said ellipsoid reflector and an axis coinciding with the major axis of said ellipsoid reflector; and
   (b) a multiplicity of optical receiving elements located so that a multiplicity of said paths of said optically encoded signals are substantially equal in length.

3. An information processing system as set forth in claim 1, wherein
   said receiving means includes parabolic reflector means having a focal point coinciding with one of said focal points of said ellipsoid reflector, an axis coinciding with the major axis of said ellipsoid reflector, and a vertex located between said first and second focal points of said ellispoid reflector;
   whereby said parabolic reflector means reflects optically encoded signals along a path parallel to said major axis of said ellipsoid reflector and towards said first focal point of said ellipsoid reflector.

4. An information processing system as set forth in claim 1, wherein
   said optical signal receiving means includes
   second processing means located at a point remote from said first and second focal points; and
   first reflector means located at or around said second focal point for reflecting, and thereby routing, optically encoded signals travelling between said optical signal processing means and said second processing means;
   whereby information carried in optically encoded signals can be optically routed between said signal processing means and other portions of said information processing system by means of reflection.

5. An information processing system as set forth in claim 4, wherein
   said optical receiving means includes
   multifaceted reflector means located at or around said second focal point, including said first reflector means, and further including parabolic reflector means having a focal point coinciding with said second focal point of said ellipsoid reflector and an axis coinciding with the major axis of said ellipsoid reflector; and
   a multiplicity of receiver elements located in or around said optical signal processing means and positioned so as to receive signals reflected by said parabolic reflector means.

6. An information processing system as set forth in claim 5, wherein
   said first reflector means includes hyperboloid reflector means having a focal point coinciding with one of the focal points of said ellipsoid reflector.

7. An information processing system as set forth in claim 5, wherein
   each facet of said multifaceted reflector means has a focal point coinciding with said second focal point of said ellipsoid reflector.

8. In an information processing system;
   means defining an internal reflecting surface in the shape of an ellipsoid having first and second focal points;
   optical signal processing means including means for transmitting a plurality of optically encoded signals along various distinct paths, a portion of each said path coinciding with a line emanating from a first one of said focal points, whereby said signals are reflected from said reflecting surface towards the second one of said focal points; and
   optical signal receiving means for collecting said signals, after reflection from said ellipsoid reflecting surface, for further processing;
   wherein
   at least a part of said optical signal processing means is located at or around said first focal point of said ellipsoid reflector;
   said optical receiving means includes parabolic reflector means having a focal point coinciding with one of said focal points of said ellipsoid reflector and an axis coinciding with the major axis of said ellipsoid reflector;
   said parabolic reflector means is oriented so as to reflect optically encoded signals, each traveling along a path including a line emanating from the focal point of said ellispoid reflector that is not coincident with the focal point of said parabolic reflector, along said major axis of said ellipsoid reflector and away from said focal point of said ellipsoid reflector that is not coincident with the focal point of said parabolic reflector; and said optical routing means also includes mirror means, external to said ellipsoid reflector means, for routing signals traveling along paths emanating from said parabolic reflector back to said optical signal processing means.

9. In a method of processing information, the steps comprising:

providing an internal reflecting surface in the shape of an ellipsoid having first and second focal points;

providing an optical signal processing means for the processing of optical information at least a part of which is located at or around said first focal point;

simultaneously transmitting distinct optically encoded signals from said optical signal processing means along a plurality of distinct paths, a portion of each said path coinciding with a line emanating from said first focal point, whereby said signals are reflected from said reflecting surface towards said second focal point; and collecting said signals after reflection from said reflecting surface for further processing;

wherein said collecting step includes the step of further reflecting a multiplicity of said optically encoded signals, after reflection from said ellipsoid reflecting surface, to said optical signal processing means.

10. A method of set forth in claim 9, further including the steps of providing optical signal receiving means and information processing means located at a point remote from said second one of said focal points; and further reflecting a plurality of said signals, after reflection from said ellipsoid reflecting surface, to said optical signal receiving means and information processing means.

11. A method as set forth in claim 9, wherein said further reflecting step includes the use of parabolic reflector means having a focal point coinciding with one of said focal points of said ellipsoid reflector, an axis coinciding with the major axis of said ellipsoid reflector, and a vertex located between said first and second focal points of said ellipsoid reflector.

12. A method as set forth in claim 11, wherein said further reflecting step includes the use of a multiplicity of optical signal receiving elements, each oriented so as to receive optically encoded signals traveling along a preselected corresponding path, and a multiplicity of said optical signal receiving elements are positioned so that a multiplicity of said paths of said optically encoded signals are substantially equal in length.

13. In a method of processing information, the steps comprising:

providing an internal reflecting surface in the shape of an ellipsoid having first and second focal points;

transmitting a plurality of optically encoded signals along various distinct paths, a portion of each said path coinciding with a line emanating from a first one of said focal points, whereby said signals are reflected from said reflecting surface towards the second one of said focal points; and collecting said signals after reflection from said reflecting surface for further processing;

providing optical signal receiving means and information processing means located at a point remote from said second one of said focal points; and further reflecting said signals, after reflection from said ellipsoid reflecting surface, to said optical signal receiving means and information processing means;

wherein said further reflecting step includes the use of parabolic reflector means having a focal point coinciding with one of said focal points of said ellipsoid reflector;

said parabolic reflector means is oriented so as to reflect optically encoded signals, each traveling along a path including a line emanating from the focal point of said ellipsoid reflector that is not coincident with the focal point of said parabolic reflector, along said major axis of said ellipsoid reflector and away from said focal point of said ellipsoid reflector that is not coincident with the focal point of said parabolic reflector; and said further reflecting step includes the use of mirror means, external to said ellipsoid reflector means, for routing signals emanating from said parabolic reflector back to said optical signal processing means.

* * * * *